(12) United States Patent
Sergi

(10) Patent No.: US 6,937,207 B1
(45) Date of Patent: Aug. 30, 2005

(54) INSULATOR TO ATTACH AN ELEMENT OF AN ANTENNA TO THE BOOM OR MAST THEREOF

(76) Inventor: Paul D. Sergi, 2570 Major Rd., Peninsula, OH (US) 44264

( * ) Notice: Subject to any disclaimer, the term of this patent is extended or adjusted under 35 U.S.C. 154(b) by 107 days.

(21) Appl. No.: 10/402,484

(22) Filed: Mar. 31, 2003

(51) Int. Cl.$^7$ ................................................ H01Q 1/12
(52) U.S. Cl. ....................................... 343/878; 343/892
(58) Field of Search ................................ 343/878, 880, 343/882, 892

(56) References Cited

U.S. PATENT DOCUMENTS

| 3,761,939 | A | * | 9/1973 | Bryant, Jr. | ................... | 343/809 |
| 3,950,758 | A | * | 4/1976 | Mirrione et al. | ............ | 343/881 |
| 4,104,642 | A | * | 8/1978 | Padilla et al. | ............... | 343/882 |

* cited by examiner

Primary Examiner—Hoang V. Nguyen
(74) Attorney, Agent, or Firm—Renner, Kenner, Greive, Bobak, Taylor & Weber

(57) ABSTRACT

A device (10 or 50) for attaching an element (11) of an antenna to the boom (12) or mast (13) of an antenna while at the same time insulating the element (11) from the boom (12) or mast (13) includes two plates (14 or 51). In one embodiment, the plates (14) are provided with a radiused recess (20) to receive the element (11) therebetween. In another embodiment, an insert (65) having a radiused surface (68) receives the element (11) and is positioned between the plates (51). In one embodiment, hub members (21) extend outwardly from the plates (14) and mate with each other, and in another embodiment, lugs (59) extend outwardly from each other and mate with each other. A clamp (25 or 61) is adapted to attach the boom (12) to the hub members (21) or the lugs (59). If the device (10) is to be attached to the mast (13), a saddle clamp (40) is provided to position the mast (13) adjacent to one of the plates (14).

40 Claims, 7 Drawing Sheets

INSULATOR TO ATTACH AN ELEMENT OF AN ANTENNA TO THE BOOM OR MAST THEREOF

TECHNICAL FIELD

This invention relates to an insulator assembly for an antenna. More particularly, this invention relates to such assemblies which can be used to attach the elements of an antenna, such as a Yagi style antenna, to the boom or mast thereof.

BACKGROUND ART

Antennas, for example, of the Yagi type, are designed to assist in the transmission or reception of radio wave signals. These antennas include a plurality of spaced tubes, known as elements, which are carried by and extend outwardly from a horizontally extending boom thereby creating a horizontally spaced array of elements. Alternatively, in some antennas, the elements may be carried by and extend outwardly from a vertically extending mast thereby creating a vertically spaced array of elements. In both instances, feeder or transmission wires are connected to at least some of the elements to carry the signals to be transmitted by, or to be received by, the elements.

A problem that exists regarding current antenna designs relates to the insulators which must be provided at the junction of each element and the boom, or the junction of each element and the mast. These insulators, usually made of a plastic material, not only act to isolate the elements from the boom or mast, but also they provide the means by which the elements are connected to the boom or mast.

For large antennas, such as log-periodic dipole antennas, heavy, sturdy insulators must be provided to properly carry the heavy, large diameter, elements. For antennas having smaller diameter and lighter elements, the use of such insulators is economically impractical. As a result, attempts have been made to create less expensive insulating devices for smaller antenna applications. Most simply, such devices can include two plates of a plastic material which can carry an element therebetween, and which can be attached to the boom. However, such devices are oftentimes not sturdy enough to assure that the boom-to-element connection will be maintained under all possible weather conditions, such as high winds or ice storms.

DISCLOSURE OF THE INVENTION

It is thus an object of the present invention to provide an insulator system which can securely carry the elements of smaller antennas.

It is another object of the present invention to provide an insulator system, as above, which can carry elements of differing diameters.

It is a further object of the present invention to provide an insulator system, as above, which can be selectively attached to either the boom or the mast of an antenna.

It is yet another object of the present invention to provide an insulator system, as above, which is strong but which is lightweight and inexpensive.

These and other objects of the present invention, as well as the advantages thereof over existing prior art forms, which will become apparent from the description to follow, are accomplished by the improvements hereinafter described and claimed.

In general, an insulator for attaching an element of an antenna to another member of an antenna, made in accordance with one aspect of the present invention, includes a first plate and a second plate. The insulator includes a radiused portion which is shaped to receive a portion of an element. Means are provided to attach the plates to each other with the element being positioned in the radiused portion between the plates.

In one embodiment of the present invention, the first and second plates each have a recess therein. Means are provided to attach the plates to the element engaged between the recesses. Clamp means are also provided to attach the other member to the plates.

In another embodiment of the present invention, the first plate and the second plate are adapted to be attached to the other member. An insert is positioned between the first and second plates, and the plates are attached to each other with the insert therebetween, the insert being adapted to receive and carry an element.

In accordance with another aspect of the invention, the insulator includes first and second plates with the element being positioned between the plates. Means are provided to attach the plates to each other with the element therebetween. The plates, when attached, include mating hub portions adapted to assist in receiving one form of the other antenna member.

In accordance with another aspect of the invention, the insulator for attaching an antenna element to an antenna boom includes a first plate having an arcuate surface to receive the boom. A second plate also has an arcuate surface to receive the boom. Means are provided to attach the plate with an element therebetween. The plates have portions extending therefrom which mate when attached, and means are provided to cooperate with the portions to attach the boom to the plates.

When the present invention is utilized to attach and insulate an element of an antenna and the mast of an antenna, the element is positionable between the first and second plates. Means are provided to attach the plates with the element therebetween, and means are also provided to attach the plates to the mast with the mast being positioned adjacent to one of the plates.

Preferred exemplary insulator systems made in accordance with the concepts of the present invention are shown by way of example in the accompanying drawings without attempting to show all the various forms and modifications in which the invention might be embodied, the invention being measured by the appended claims and not by the details of the specification.

PREFERRED EMBODIMENTS FOR CARRYING OUT THE INVENTION

Figure 1:
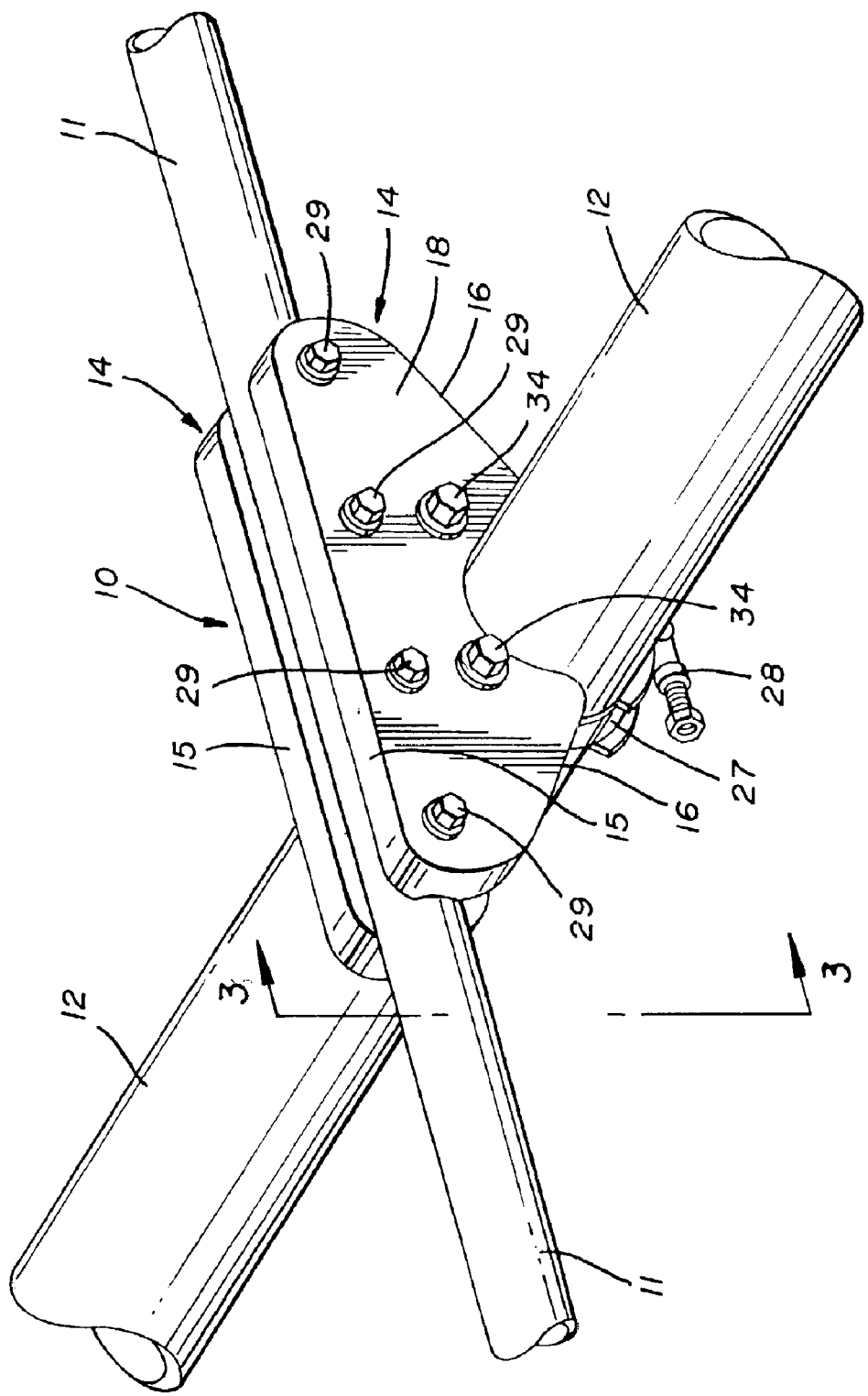
FIG. 1 is a perspective view of an insulator made in accordance with the present invention showing the insulator attaching an element of an antenna to the boom of the antenna.
Figure 2:
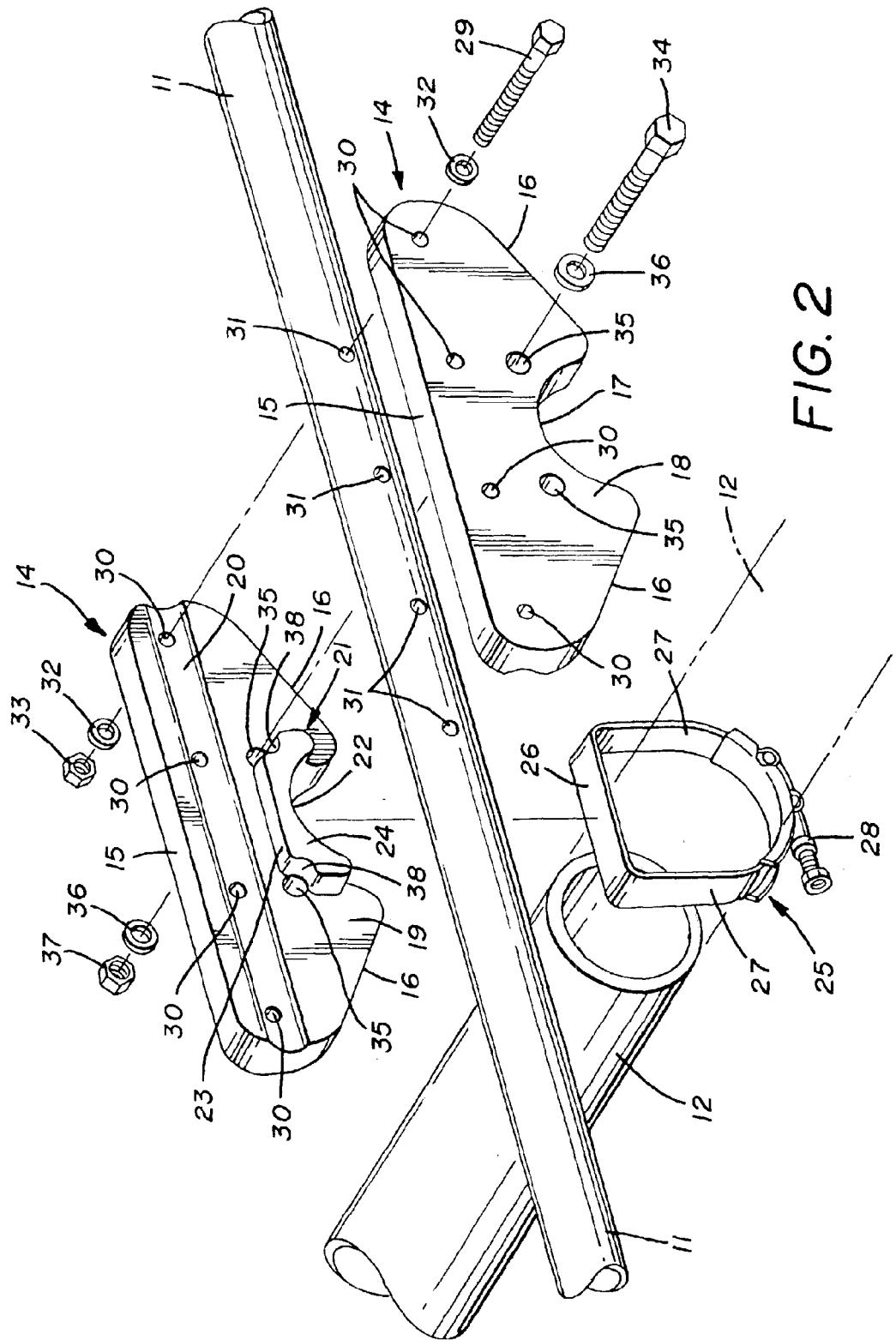
FIG. 2 is an exploded perspective view of the insulator of FIG. 1 showing the components thereof.
Figure 3:
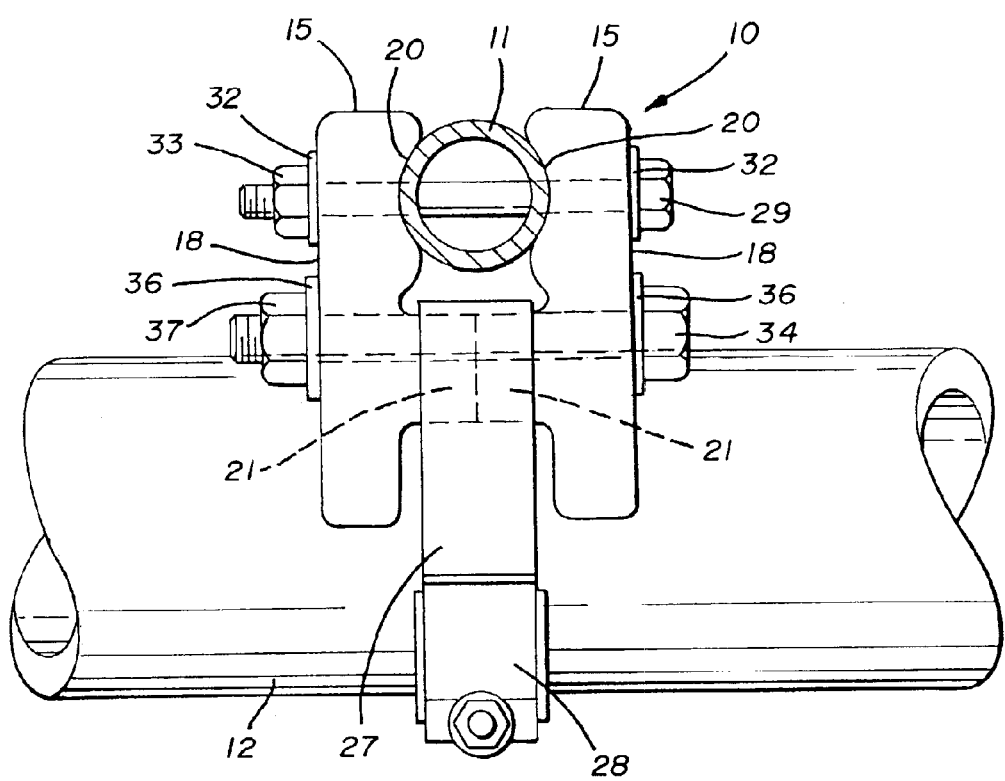
FIG. 3 is a sectional view taken substantially along line 3—3 of FIG. 1.
Figure 4:
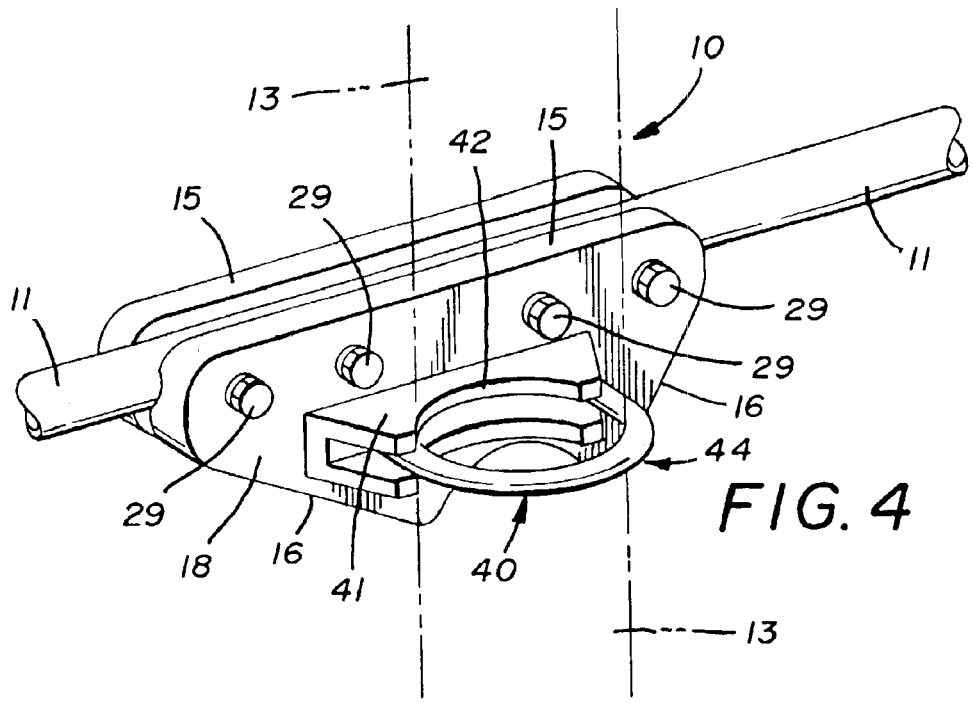
FIG. 4 is a perspective view of the insulator of FIG. 1 showing it attaching an element of an antenna to the mast of the antenna.
Figure 5:
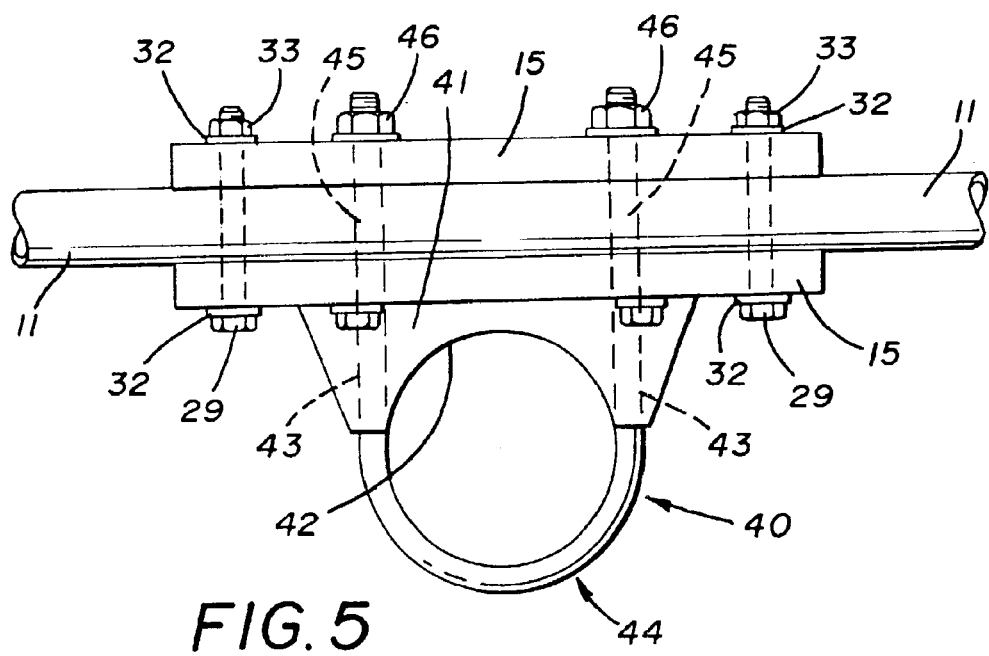
FIG. 5 is a top plan view of that which is shown in FIG. 4.

Shown in FIGS. 1–5 is an insulating device, generally indicated by the numeral 10, for electrically isolating or insulating, while at the same time attaching, an element 11 of an antenna from another member of the antenna. As shown in FIGS. 1–3, that other member can be the boom 12 of the antenna which normally extends horizontally outward from an antenna tower or mast. As such, elements 11 are spaced along boom 12 and extend laterally outward therefrom. As shown in FIGS. 4 and 5, the other member which can be connected to elements 11 by means of insulating device 10 is the antenna mast 13 itself, shown in phantom in FIG. 4. Thus, in the embodiment shown in FIGS. 4 and 5, elements 11 are vertically spaced along mast 13 and extend laterally outwardly therefrom.

The primary components of insulating device 10 are a pair of identical plates indicated generally by the numeral 14. The fact that plates 14 are identical renders device 10 very economically and easily manufacturable. Plate 14 are preferably molded from a sturdy plastic material so as to electrically isolate and insulate element 11 carried thereby from the other antenna member, boom 12 or mast 13. A preferred material for plates 14 is a strong, rigid, ultra-violet resistant plastic material, such as rigid thermoplastic polyurethane or the like.

Each plate 14 is generally triangularly shaped having a top edge 15 with opposed side edges 16 extending from the radiused ends of top edge 15 and converging toward each other. However, edges 16 do not meet each other but rather an arcuate edge 17 is formed between edges 16. As will hereinafter be described in more detail, boom 12 is received within arcuate edges 17 of opposed plates 14, and thus the radius of arcuate edge 17 should be designed to accommodate the radius of boom 12 of the antenna. However, it should be understood that an arcuate edge 17 of a particular size could accommodate booms 12 of at least a small range in sizes.

Each plate 14 also has an outside face 18 and an inside face 19 with faces 19 facing each other when insulating device 10 is assembled. Outside face 18 is generally planar, but inside face 19 is configured to cooperate with the inside face of an adjacent plate 14 to assist in receiving and attaching element 11 and boom 12. Specifically, face 19 is provided with a radiused recess 20 extending longitudinally along the direction of an element 11 and adapted, with recess 20 of an adjacent plate 14, to receive element 11. Thus, the radius of recess 20 should preferably be designed to match or otherwise accommodate the radius of element 11 of the antenna. However, it should be apparent that a radiused recess 20 of a particular size could accommodate elements 11 of at least a small range in sizes. It should also be evident that opposed recesses 20 provide more surface area contact with an element 11 than would be provided, for example, by the flat plates of the prior art. Thus, element 11 is more firmly held between plates 14 which is important, particularly in high wind conditions.

Internal face 19 of each plate 14 is also provided with a hub member generally indicated by the numeral 21. Hub member 21 extends from face 19 and includes an arcuate lower edge 22 which generally matches arcuate edge 17, and an upper, preferably flat, bearing surface 23. Each hub member 21 has an internal flat face 24 which faces and mates with face 24 of the adjacent plate 14 when insulating device 10 is assembled.

The mating of hub members 21 not only adds stability and strength to device 10 but also presents an adequate bearing surface to receive a clamp generally indicated by the numeral 25. Clamp 25 is provided to attach boom 12 to device 10, and includes a D-shaped band having a flat portion 26 and a curved portion 27 interconnecting the ends of flat portion 26 through a conventional tensioning assembly 28. As shown in the drawings, flat portion 26 of clamp 25 is adapted to engage the combined bearing surfaces 23 formed by the mating of hub members 21. Boom 12 is thus received within the band and is maintained in place by the tightening of tensioning assembly 28.

Plates 14 are attached to each other with an element 11 therebetween by a plurality of fasteners, shown to be in the form of bolts 29. Bolts 29 pass through apertures 30 formed in plates 14 as well as apertures 31 in element 11 which may be aligned with apertures 30 for that purpose. Appropriate washers 32 and nuts 33 are also provided so that element 11 may be tightly received between plates 14 within recesses 20.

A second plurality of fasteners, shown in the form of bolts 34, add further stability at the attachment of plates 14, particularly at the area of boom 12 and hub members 21, to assure that hub faces 24 tightly mate with each other. Thus, bolts 34 are received through apertures 35 formed in plates 14. Washers 36 and nuts 37 are also provided so that a tight connection between plates 14 is assured. It should be noted that bolts 34 pass near the outer edges of bearing surface 23 of hub members 21 and notches 38 are formed in hub members 21 for that purpose. In this manner, clamp 25 may not only be received by the tightly mated hub members 21, but also it may extend around bolts 34 to provide additional strength to the attachment of boom 12.

However, as shown in FIGS. 4 and 5, insulating device 10 may also be used to attach an element 11 to the vertically extending mast 13 instead of boom 12. In this configuration, element 11 is attached to plates 14 in an identical fashion as described with respect to FIGS. 1–3. However, instead of a boom 12 being attached to plates 14 by a clamp 25, an adjustable saddle clamp, indicated generally by the numeral 40, is provided to attach plates 14 to mast 13.

Saddle clamp 40 includes a hub or base 41 having a radiused surface 42 and having apertures 43 therethrough which are alignable with apertures 35 in plates 14. A U-shaped clamping member 44 has threaded arms 45 which are adapted to be received through apertures 43 and 35 and tightened by nut assemblies 46 to not only assist fasteners 29 in holding plates 14 together, but also to provide a tight grip on mast 13. Saddle clamp 40 can thus accommodate at least a small range of sizes of masts 13 which are receivable between the radiused surface 42 of hub 41 and U-shaped clamp member 44. The mast 13 is thus positioned adjacent to one of the plates 14.

It should also be noted that device 10 may be attached to other antenna members in addition to boom 12 or mast 13. For example, a plate could be attached to device 10 with a face of the plate mating with outside face 18 of one of the plates 14. Then one or more attachment devices, such as saddle clamp 40, could be used to attach the plate, and thus an element 11, to a mast 13, for example. By providing such a means by which multiple saddle claims 40 could be used to hold a mast would be particularly useful to prevent an element from rotating on a mast under high wind conditions.

Some antennas are provided with split elements, such as elements 11A and 11B shown in the FIGS. 6–8 embodiment to be hereinafter discussed. While the element 11 shown in FIGS. 1–5 is one piece, it should be understood that device 10 could readily be useable to hold the split element halves 11A and 11B to boom 12 or mast 13. Thus, two of the bolts 29 would be holding one element half between recesses 30 in mating plates 14, and the other two bolts 29 would be holding the other element half between recesses 20 in mating plates 14, the element halves 11A and 11B being longitudinally spaced slightly from each other. The embodiment shown in FIGS. 6–8, now to be described, could likewise be utilized for a one-piece element but has been shown with element halves 11A and 11B to illustrate that option.

Figure 6:
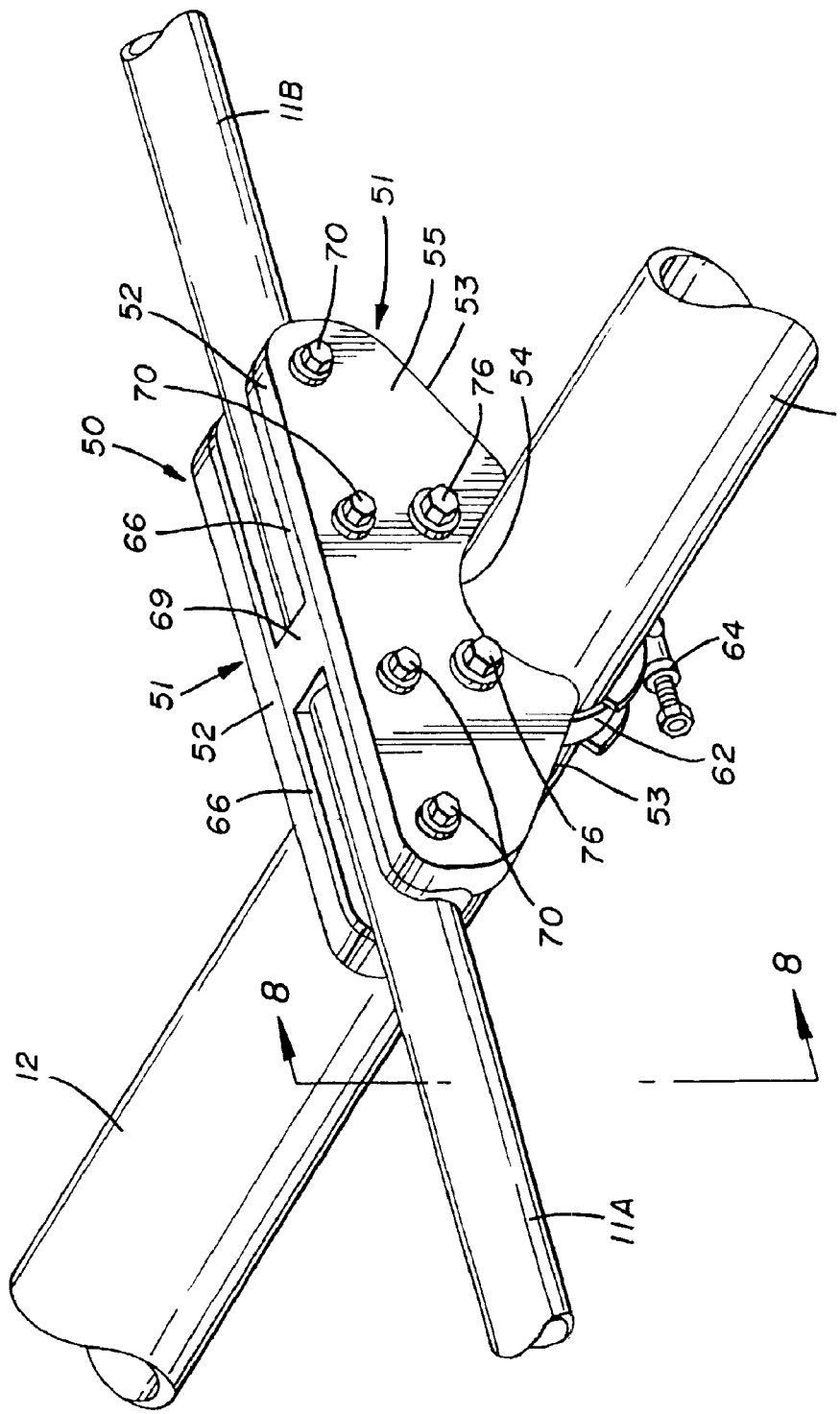
FIG. 6 is a perspective view of another embodiment of an insulator made in accordance with the present invention showing the insulator attaching element halves of an antenna to the boom of the antenna.
}
Figure 7:
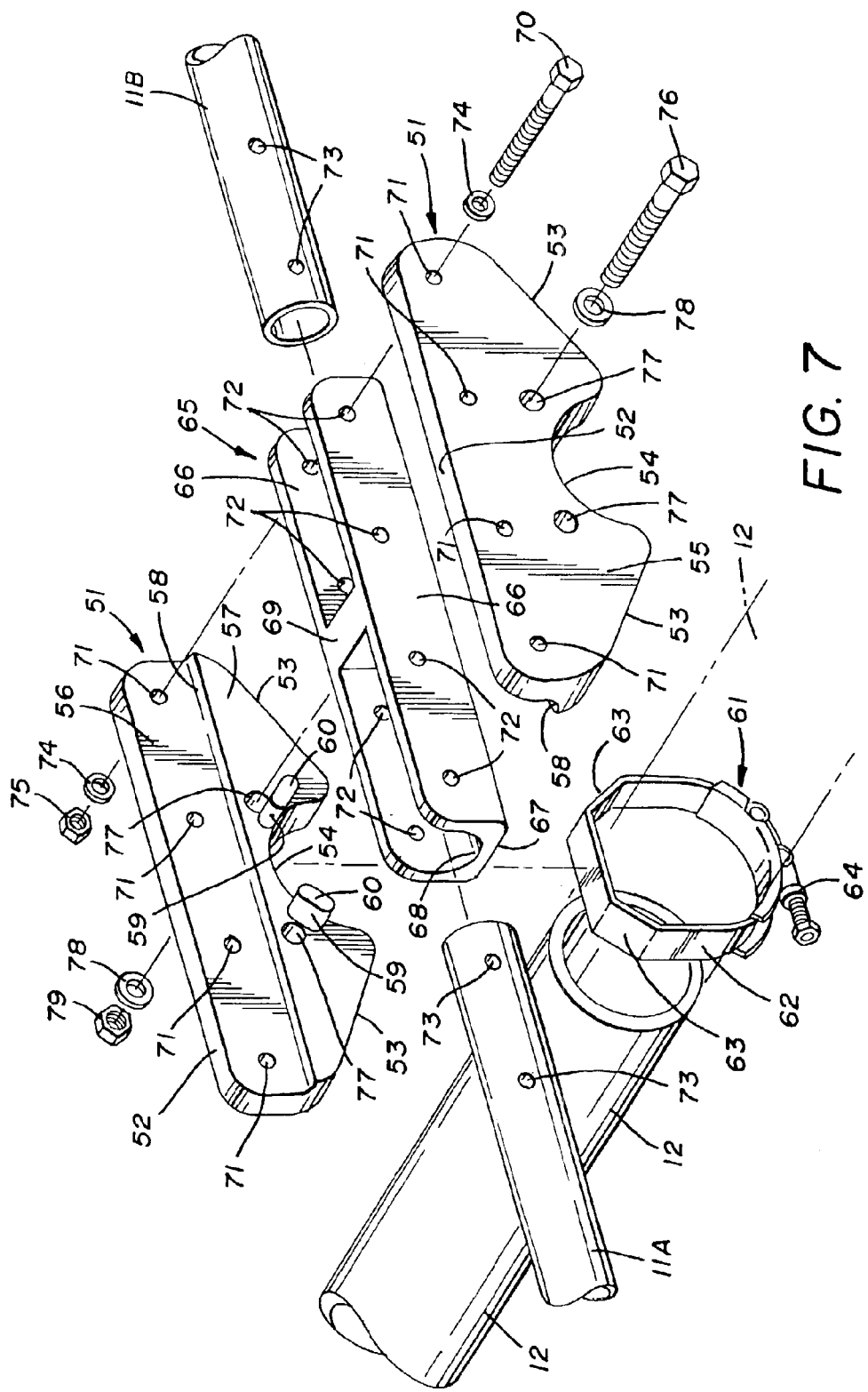
FIG. 7 is an exploded perspective view of the insulator of FIG. 6 showing the components thereof.
Figure 8:
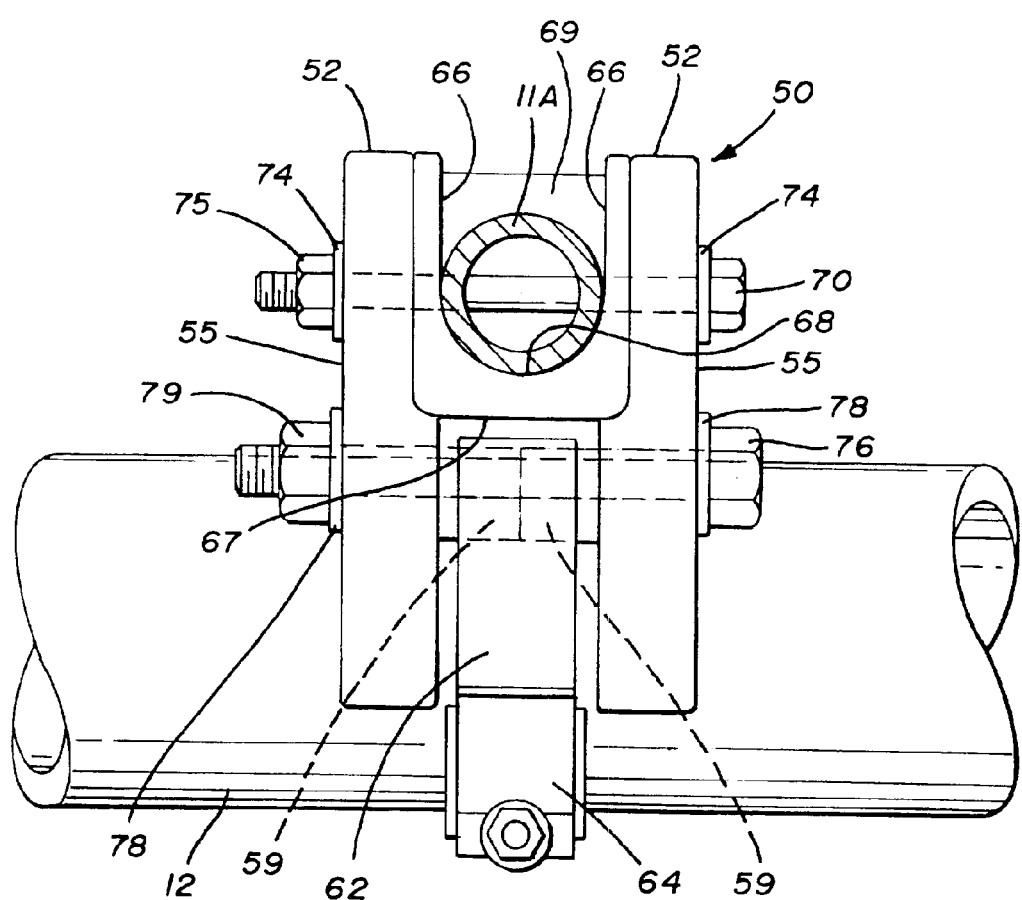
FIG. 8 is a sectional view taken substantially along line 8—8 of FIG. 6.

The insulating device in made accordance with the embodiment of FIGS. 6–8 is indicated generally by the numeral 50. Insulating device 50 includes a pair of identical plates, generally indicated by the numeral 51. Plates 51 are similar to plates 14 and are likewise manufactured from a sturdy plastic material so as to electrically isolate and insulate an element 11, or element halves 11A and 11B, as shown, from boom 12. Like plates 14, the preferred material for plates 51 is a rigid, ultra-violet resistant plastic material, such as rigid thermoplastic polyurethane or the like.

Each plate 51 is generally triangularly shaped having a top edge 52 with opposed side edges 53 extending from the radiused ends of top edge 52 and converging toward each other. Like the embodiment of FIGS. 1–3, edges 53 do not meet but rather an arcuate edge 54 is formed between edges 53. Also like the embodiment of FIGS. 1–3, boom 12 is received within arcuate edges 54 of opposed plates 51 which may accommodate a boom 12 of at least a small range in sizes.

Each plate 51 also includes an outside face 55 and a stepped inside face having an upper face portion 56 separated from a lower face portion 57 by a ledge 58. Two lugs 59 extend outwardly from lower face portion 57 and are circumferentially spaced along arcuate edge 54. Lugs 59 have internal flat faces 60 which mate with the faces 60 of lugs 59 of the adjacent plate 51 when device 50 is assembled.

The mating of lugs 59 not only adds stability and strength to device 59 but also presents a bearing surface to receive a clamp generally indicated by the numeral 61. Like clamp 25, clamp 61 attaches boom 12 to device 50 and includes a band 62 having portions 63 adapted to engage lugs 59. Band 62 is tightened by a conventional tensioning system 64 to hold boom 12 in place.

Insulating device 50 also includes an element-holding insert generally indicated by the numeral 65. Insert 65 is preferably made of the same material as plates 51 and includes opposed sidewalls 66 interconnected by a bottom wall 67 having an upper radiused surface 68. As such, insert 65 forms an open channel, defined on three sides by sidewalls 66 and radiused surface 68, to receive element 11. If, as shown in FIGS. 6 and 7, element 11 is split into element halves 11A and 11B, the channel can be divided by a cross member 69 extending between sidewalls 66.

To assemble insulating device 50, bottom wall 67 of insert 65 is placed on ledges 58 of opposed plates 51, and the entire assembly is fastened together by a plurality of fasteners shown to be in the form of bolts 70. Bolts 70 pass through apertures 71 formed in plates 51 and apertures 72 formed in sidewalls 66 of insert 65. In addition, apertures 73 in element halves 11A and 11B are aligned with apertures 71 and 72 to receive bolts 70. Appropriate washers 74 and nuts 75 are also provided so that insert 65, and thus element halves 11A and 11B, may be tightly received between plates 51.

A second plurality of fasteners, shown in the form of bolts 76, add further stability to the attachment of plates 51, particularly at the area of boom 12 and lugs 59 to assure that lug faces 60 tightly mate with each other. Thus, bolts 76 are received through apertures 77 formed in lower face portion 57 of plates 51. Washers 78 and nuts 79 are also provided to assure a tight connection. Bolts 76 thus pass near lugs 59 and, if desired, clamp 61 can be designed to extend around bolts 76 as well, in a fashion similar to that shown in the FIGS. 1–3 embodiment.

The advantage of the embodiment of FIGS. 6–8, just described, is that without having to change plates 51, by merely changing insert 65, a wide variety of sizes of elements 11 can be accommodated. That is, by changing the radius of surface 68 and the spacing of sidewalls 66, elements having a larger or smaller diameter can be readily carried by the same plates 51.

It should thus be evident that the devices for insulating the elements of an antenna from the boom or mast of the antenna made as described herein accomplishes the objects of the present invention and otherwise substantially improves the art.

What is claimed is:

1. An insulator for attaching an element of an antenna to an antenna mast comprising a first plate, a second plate, a radiused portion shaped to receive a portion of an element, clamp means to attach the mast to said plates at a position adjacent to one of said plates, and means to attach said plates to each other with the element being positioned in said radiused portion between said plates.

2. The insulator of claim 1 wherein said clamp means includes a hub having a radiused surface and a clamping member which is attachable to said plates with the mast between said hub and said clamping member.

3. The insulator of claim 1 wherein each plate has a face, said faces facing each other when said plates are attached to each other, and said radiused portion being formed in each said face.

4. An insulator for attaching an element of an antenna to the boom of an antenna comprising a first plate, a second plate, a radiused portion shaped to receive a portion of an element, each said plate having an arcuate edge, the boom being received against said edges, and means to attach said plates to each other with the element being positioned in said radiused portion between said plates.

5. The insulator of claim 4, each said plate having lug members spaced along said arcuate edge, said lug members mating with each other when said plates are attached, and further comprising clamp means to engage the boom and said lug members to attach the boom to said plates.

6. The insulator of claim 4, each said plate having a hub member, said hub members mating with each other when said plates are attached and having arcuate edges to receive the boom.

7. The insulator of claim 6, said hub members having a bearing surface and further comprising clamp means to engage the boom and said bearing surfaces to attach the boom to said plates.

8. The insulator of claim 7 further comprising second means to attach said plates together, said second means being received within said clamp means.

9. An insulator for attaching an element of an antenna to another member of the antenna comprising a first plate, a second plate, an insert separate from said plates and positioned between said plates, said insert having a radiused portion shaped to receive a portion of an element, and means to attach said plates to each other with the element being positioned in said radiused portion between said plates.

10. The insulator of claim 9 wherein each plate has a face, said faces facing each other when said plates are attached to each other, and a ledge formed in each said face, said insert being received on said ledges.

11. The insulator of claim 9, said means to attach being received through said plates, the element and said insert.

12. The insulator of claim 9 wherein said insert includes opposed side walls extending upwardly from said radiused portion to form a channel, the element being received in said channel.

13. The insulator of claim 12 wherein the element is divided into element portions, an end of each element portion being received in said channel, said insert including a cross member extending between said side walls and between the element portions.

14. An insulator for attaching an element of an antenna to another member of the antenna comprising a first plate having a recess therein, a second plate having a recess therein, means to attach said plates with an element engaged between said recesses, and a clamp means to attach the other member to said plates.

15. The insulator of claim 14 wherein said recesses are radiused to accommodate the approximate circumference of the element.

16. The insulator of claim 14, each said plate having an arcuate edge, wherein the member is an antenna boom received against said edges.

17. The insulator of claim 16, each said plate having a hub member, said hub members mating with each other when said plates are attached and having arcuate edges to receive the boom, said clamp means engaging said hub members.

18. The insulator of claim 14 wherein the member is an antenna mast, said clamp means attaching said mast at a position adjacent to one of said plates.

19. The insulator of claim 18 wherein said clamp means includes a hub having a radiused surface and a clamping member which is attachable to said plates with the mast between said hub and said clamping member.

20. An insulator for attaching the elements of an antenna to another member of the antenna comprising a first plate, a second plate, said first and second plates being adapted to be connected to the member, and an insert separate from said plates and positioned between said first and second plates, said first and second plates being attached to each other with said insert therebetween, said insert being adapted to receive and carry the element.

21. The insulator of claim 20, each said plate having an arcuate edge, wherein the member is an antenna boom received against said edges.

22. The insulator of claim 21, each said plate having lug members spaced along said arcuate edge, said lug members mating with each other when said plates are attached, and further comprising clamp means to engage the boom and said lug members to attach the boom to said plates.

23. The insulator of claim 20 wherein the member is an antenna mast, and further comprising clamp means to attach said mast to said plates at a position adjacent to one of said plates.

24. The insulator of claim 23 wherein said clamp means includes a hub having a radiused surface and a clamping member which is attachable to said plates with the mast between said hub and said clamping member.

25. The insulator of claim 20 wherein each plate has a face, said faces facing each other when said plates are attached to each other, and a ledge formed in each face, said insert being received on said ledges.

26. The insulator of claim 20 wherein said insert has a radiused portion to accommodate the approximate circumference of the element.

27. The insulator of claim 26 wherein said insert includes opposed side walls extending upwardly from said radiused portion to form a channel, the element being received in said channel.

28. The insulator of claim 27 wherein the element is divided into element portions, an end of each element portion being received in said channel, said insert including a cross member extending between said side walls and between the element portions.

29. An insulator for attaching an element of an antenna to another member of an antenna comprising a first plate, a second plate, the element being positionable between said first plate and said second plate, means to attach said plates to each other with the element therebetween, said plates having hub portions which mate when said plates are attached and which are adapted to assist in receiving one form of the member.

30. The insulator of claim 29 wherein the member is an antenna boom and further comprising clamp means to attach the boom to said hub portions.

31. The insulator of claim 30, each said plate having an arcuate edge, the boom being received against said edges.

32. The insulator of claim 30, said hub members having arcuate edges to receive the boom and bearing surfaces to be engaged by said clamp means.

33. The insulator of claim 30 further comprising second means to attach said plates together, said second means being received within said clamp means.

34. The insulator of claim 29, each plate having a recess therein, the element being positioned between said recesses in said plates.

35. An insulator for attaching an element of an antenna to the boom of the antenna comprising a first plate having an arcuate surface to receive the boom, a second plate having an arcuate surface to receive the boom, means to attach said plates with the element therebetween, said plates having portions extending therefrom which mate when attached, and means cooperating with said portions to attach the boom to said plates.

36. The insulator of claim 35, each plate having a recess therein, the element being positioned between said recesses in said plates.

37. The insulator of claim 35 further comprising an insert positioned between said plates, said insert being adapted to receive the element.

38. An insulator for attaching an element of an antenna to the mast of an antenna comprising a first plate, a second plate, the element being positionable between said first and second plates, first means to attach said plates with the element therebetween, and second means to attach the mast to said plates with the mast being positioned adjacent to one of said plates.

39. The insulator of claim 38, each plate having a recess therein, the element being positioned between said recesses in said plates.

40. The insulator of claim 38 further comprising an insert positioned between said plates, said insert being adapted to receive the element.

* * * * *